Figure 1:
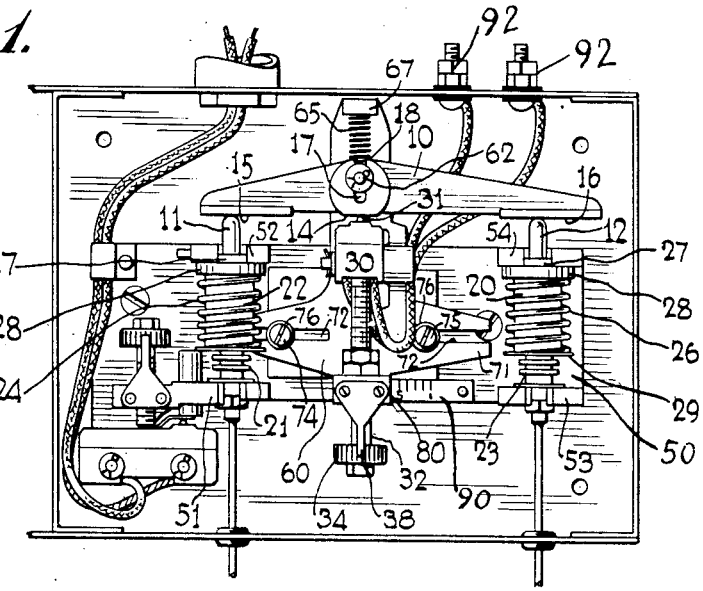

Oct. 6, 1942.                F. JEHLE                  2,297,705
           METHOD OF ADJUSTMENT FOR TEMPERATURE CONTROLLERS
                        Filed Aug. 3, 1940

INVENTOR
FERDINAND JEHLE
BY Hammond Littell
ATTORNEYS

Patented Oct. 6, 1942

2,297,705

UNITED STATES PATENT OFFICE 2,297,705

METHOD OF ADJUSTMENT FOR TEMPERATURE CONTROLLERS

Ferdinand Jehle, New Canaan, Conn., assignor to Hoffman Specialty Co., Inc., Stamford, Conn., a corporation of Illinois Application August 3, 1940, Serial No. 350,637

3 Claims. (Cl. 236—91)

This invention relates to a temperature control apparatus primarily designed for hot water heating systems, and to a method of setting said controller whereby the enclosure will be correctly heated for all variations in outside temperature conditions.

In the copending application, Serial No. 350,638, filed August 3, 1940, there is described and claimed a control apparatus designed to vary the temperature of a control medium either for heating or cooling by variation in the temperature of another medium, such as the outside atmosphere.

When such apparatus is used to control a hot water heating system by variations of outside temperature, it is often found that the heating system has not been designed or installed accurately to predetermined conditions. Under such circumstances, when the controller has been set at the factory, to give accurate heat at the given design conditions, the heating is unsatisfactory, even though the controller may be adjustable to maintain the enclosure heated by the system at a desired temperature for any specific outside temperature.

In such cases, the ratio of the variation of the outside temperature with that of the heating medium is incorrect and therefore the temperature of the enclosure heated by the system will fluctuate with variations of outside temperature instead of remaining at a fixed even figure, regardless of outside temperature variations. To overcome this difficulty the controller must be reset to give the correct ratio setting for the rate of variation of the outside temperature with that of the heating medium.

In order to overcome these objections and provide accurate controlled heating for a given installed heating system under all outside temperature conditions, the control unit was so designed and constructed and the heat requirements so calculated at the various temperatures that it is possible to accurately set the control device to give the desired heating in any reasonably designed and installed hot water heating system.

It is the object of my invention to provide a method of setting a control unit of the type herein described which will function in a hot water heating system to give accurate heat output for all variations of outside temperature within given limits.

Another object of my invention is to provide a preconstructed control unit and a preconstructed chart whereby the control unit can be accurately set in the field without complicated mathematical calculations to give the correct output for a given heating system at all outside temperatures.

Yet another object of my invention is to provide a chart and a method of setting a temperature controller so that after the proper amount of heat to be supplied to a house or other enclosure to maintain it at a desired temperature is ascertained by a trial and error method for one outside temperature, the chart readings will give the setting for the temperature controller such that after the setting is made, the same house temperature will be maintained throughout the heating season and all subsequent heating seasons without any necessity for further testing, or for changing of the setting.

Various other objects and advantages of my invention will appear as the description proceeds.

Figure 2:
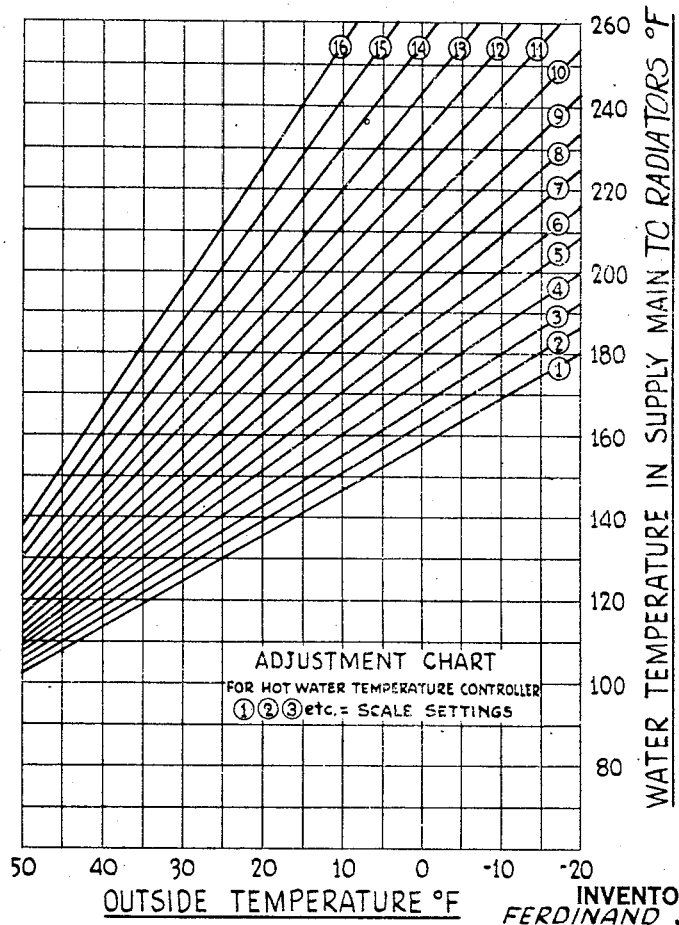

In the drawing which illustrates a practical embodiment of my invention:

Figure 1 is a front view of the control element showing the adjustable parts and scale; and Figure 2 is a copy of the chart used in setting the control element.

The details of the control element are more specifically described in said copending application referred to above, and I will describe herein only those parts which are necessary to an understanding of the setting of the control element. These parts include, in general, lever arm 10 mounted for pivotal and vertical movement, two temperature responsive expansion elements 21 and 23 mounted in spaced relationship and adaptable to affect the position of the lever arm, a pressure responsive electrical switch 30 adaptable for actuation by pressure exerted by the lever arm on button 31 and a laterally slidable support 60, whereby the position of the switch and lever arm may be adjusted relative to the temperature responsive elements 21 and 23, to change the ratio setting of the lever arm 10 relative thereto.

The temperature responsive expansion elements 21 and 23 are of the simple bellows type, provided with cylindrical extension or plungers 11 and 12 fastened to their tops or extreme ends. They are held in fixed parallel axial alignment on base 50 by means of brackets 51, 52, 53, 54, bellows hats 20 and 22 and springs 24 and 26. The lower end of each member 21, 23 is firmly fixed in brackets 51 and 53 respectively, while the cylindrical extensions or plungers 11 and 12 of the upper portion of the bellows 21 and 23 are free to move axially. The cylindrical extensions pass through a collar 27 provided on spring caps 28 seated in brackets 52 and 54 which overlie the brackets 51 and 53, respectively. The springs 24 and 26 which encircle the bellows hats 20 and 22 and abut the spring caps 28 at one end, abut and press down on shoulders 29 of the bellows hats, thereby opposing the expansion of the bellows 21 and 23, and tend to return the plungers 11 and 12 to retracted position when the contraction of the fluid actuating the respective bellows will permit.

The illustrated lever arm 10 is considerably longer than the distance between the axes of the cylindrical extensions 11 and 12 to permit a lateral shifting of the lever arm, and still have it overlie the tops of the cylindrical extensions which at times engage the lever arm to affect its position. To insure that the possible points of contact are all in the same plane the lever arm is provided with flat surfaces 14, 15 and 16. It is further provided with a slot 17 and a seat or recess 18 at the top of the lever in axial alignment with the slot. The slot 17 permits the lever to be rotatably and vertically movable about a fixed pin 62 mounted on the slidable support 60. This pin supports the lever arm on the support 60 and confines its motion to a single plane. The recess 18 of the lever 10 serves as a seat for spring 65 which abuts bracket 67 of the slidable support 60. The spring 65 presses the lever arm downwardly and forces it to rest on the tops of one or both of the plungers 11 and 12, or the switch button 31.

The oblong casing of the pressure responsive switch 30 is pivotally hinged at its front end to a bracket of support 60, while the rear end is supported on an adjusting screw 32, which permits it to be raised or lowered with respect to the pivotally mounted front end. This adjusting screw 32 threadably engages and passes through a bracket on the slidable support, the adjustment as to height being made by turning notched knob 34, thus raising or lowering the end of the casing through which pressure responsive control button 31 protrudes. The notches of knob 34 cooperate with a spring pointer 38 mounted on the bracket through which the adjusting screw passes. The spring frictionally engages the notches in the knob which helps to indicate its setting and prevents slipping of the adjustment screw. The terminals of the switch 30 are connected with terminals 92 on the wall of the control box by means of insulated wire. These latter terminals are mounted on but insulated from the box. In this position they are readily accessible for connecting the switch into an electrical circuit by means of which an electrically operated valve or other apparatus is controlled.

The slidable frame or support 60 on which both switch 30 and lever arm 10 are mounted is provided with laterally extending tongues 71 having laterally extending slots 72. These slots permit the support 60 to be slidably mounted on base 50 by means of bolts 74 and 75. These bolts are provided with heads or have washers 76, which abut the surface of the support 60 and threadably engage base 50, so that by loosening the bolts 74 and 75 the support 60 and parts mounted thereon can be slid to the right or left relative to the base 50 and parts mounted thereon, to vary the ratio of the distances between the switch button 31 and the axes of the cylindrical extensions 11 and 12 from a maximum to a minimum.

The base of the bracket through which the adjusting screw passes is provided with a side wall 80, which acts as a pointer for the scale 90 fastened along the bottom edge of base 50, so that by noting the position of the edge 80 on the scale 90, the relative setting of the control device can be read. In the construction illustrated, the scale 90 has sixteen marked settings, of which only six show in Figure 1, the remainder being covered by the base of the bracket through which the adjusting screw 32 passes. The construction and operation of the control assembly is more completely described in the said copending application Serial No. 350,638, filed August 3, 1940.

The chart illustrated in Figure 2 of the drawing is a preferred embodiment of the type of adjustment chart suitable for use in making field adjustments, although it can take other forms. The abscissa of the illustrated chart is set off to indicate the outside temperature in degrees Fahrenheit with the ordinates set off to represent water temperature in the radiator supply main in degrees Fahrenheit. For purposes of convenience the chart has been constructed in such manner that the temperatures decrease as the distance from the coordinates increases. The particular chart illustrated contains sixteen numbered lines in fan formation and is constructed to give direct readings when the desired enclosure temperature is 70°.

The lines represent various settings on the scale 90 of the control element whereby the heat supply from heating units can be adjusted to suit various houses, buildings and similar enclosures differing from each other in the rate of heat loss due to difference in construction, insulation and radiation capacity, and differing from each other in type of heating system. Each line represents a specific relationship of heating medium temperatures to outside temperatures and is applicable to all those enclosures having the same rate of heat loss and heating characteristics.

The general formula by means of which the chart can be prepared is as follows: The actual lever arm distance on the control unit between the switch button and the axis of the bellows actuated by the outside temperature is to the lever arm distance between the switch button and the axis of the bellows actuated by the hot water temperature as the maximum difference in outdoor temperature is to the maximum difference in hot water temperatures for said outside temperature. For example, if A = distance on lever arm between switch and axis of air temperature bellows
B = distance on lever arm between switch and axis of water temperature bellows
C = maximum outdoor temperature difference during the heating season
D = difference between minimum supply water temperature and maximum supply water temperature during the heating season, then $A:B = C:D$ For the sake of simplification the following will show how the chart can be derived in two stages. The first step is to calculate the actual numerical value of the lever arm ratios for each of the numbered scale readings on scale 90, when the laterally movable support has been adjusted so that pointer 80 indicates the individual settings. These numerical ratios are obtained by dividing the distances on the lever arm between the point where the button 31 touches the lever arm and the point where the cylindrical extension 11 touches the lever arm, by the distance on the lever arm between the point at which the button 31 touches the lever arm and the point at which extension cylinder 12 touches it. For example, the following table shows the numerical ratios which were found to exist for a few of the sixteen divisions indicated on the scale of a control instrument in which the axes of the fixedly mounted expansion elements were four and one-quarter inches apart:

| Setting | Ratio |
|---|---|
| 1 | .9 |
| 4 | .75 |
| 8 | .586 |
| 12 | .457 |
| 16 | .344 |

Having determined the ratios for the various settings the adjustment chart can then be calculated for any desired enclosure temperature. The chart illustrated herein is constructed for an enclosure temperature of 70° F. For example, it may be constructed in accordance with the following formula:

Let—
X equal the numerical value of the ratio of the distances between the switch and the axes of the temperature responsive elements;

Y equal the difference between the maximum and minimum supply water temperature during the heating season.

Let—
0° F. equal the lowest outside temperature, and 70° F. equal the highest outside temperature, then 70° F. will equal the maximum difference in outside air temperature.

If 80° F. equals the minimum supply water temperature necessary to keep the hot water in the supply main at the desired temperature at 70° F. outside temperature; then by using the formula given above, namely:

The distance on the lever arm between the axis on the outside expansion element and the switch is to the distance on the lever arm between the switch and the axis of the water temperature responsive element as the maximum difference of outside atmospheric temperature is to the maximum difference in the water temperature supply mains, or $$\text{above calculated ratio} = \frac{\text{outside temperature difference}}{\text{maximum water temperature difference}}$$

which, in this case is equal to $$X = \frac{70}{Y}$$

or $$Y = \frac{70}{X}$$

The maximum supply water temperature at 0° outside temperature is then equal to: 80+Y. These values for each scale setting give a point for 0° outside temperature which is on a straight line originating at 70° outside temperature and 80° supply water temperature. For example, when the ratios given above have been substituted in the formula, the following numerical values will be obtained for Y and Y+80:

| Scale setting | Y | Y+80 |
|---|---|---|
| 1 | 77.7 | 157.7 |
| 4 | 93.3 | 173.3 |
| 8 | 120 | 200 |
| 12 | 153 | 233 |
| 16 | 208 | 288 |

The adjustment chart illustrated in Figure 2 can then be drawn up by connecting the point of intersection of 70° outside temperature and 80° water supply temperature, with the points of intersection on the chart indicated by 0° outside temperature and a water temperature of Y+80°. It is not essential that the lines actually be drawn if the chart is sufficiently large to contain all the reference points. Other means may be provided for connecting the reference points in order to facilitate a reading thereof.

When once the chart has been constructed for any control device provided with a suitable scale setting, it can be used for setting and resetting the temperature control to maintain the enclosure at any reasonable temperature, provided the heating system is of a reasonably accurate design.

The chart can then be used in the following manner for resetting a temperature controller, if the setting at the factory was incorrect, or if the heating system was not accurately installed at the design temperatures, or if the house owner wishes to maintain a different temperature. The first step is to bring the house or enclosure to a desired temperature and keep it constant at that point, for example, 70° F. This can be accomplished by adjusting the height of button 31 by means of knob 34 of the controller. After the enclosure has been kept at the desired temperature, say 70° F., for at least one-half hour, a thermometer or other temperature measuring means should be used to measure the supply water temperature. This may be done by selecting a place on the supply main, preferably six feet beyond the place where it leaves the boiler, and fastening the thermometer or temperature measuring device to the bare pipe, being sure that the bulb actually touches the pipe. A thermometer with well inserted in the supply pipe is a more accurate means, if this can be used. The temperature to be read on the thermometer is that prevailing in the supply main immediately after the switch 30 is closed; that is, just before hot water begins to be fed into the radiator circuit. The closing of the switch can be determined by listening for its characteristic click or by the lighting of a lamp placed across the binding posts 92 protruding through the casing of the control box. At least three or four readings of the water temperature should be taken immediately after the closing of the switch and before the feeding of hot water begins. This point can be recognized either by the click or the lighting of the lamp.

During the time that the water temperature is being measured several outside temperature readings should also be taken with a thermometer placed somewhere near the outside temperature bulb, but not in the sun. If there has been, during the time of making these observations, a change of two or more degrees in the outside temperature the work should be done over. It should be pointed out that the lower the outside temperature, the more accurately and more easily can the controller be adjusted. After having noted the various temperature readings, the adjustment chart should be consulted to determine the new setting of the temperature controller according to the scale numbers 1 to 16 thereon. If the house or enclosure temperature was maintained at 70° F., the intersection of a horizontal line drawn from the water supply temperature with a vertical line drawn from the outside temperature, indicates the new scale setting from the sloping lines given on the chart. The scale setting can easily be read by means of the numbers enclosed in circles on each of the respective lines. If the house or enclosure was maintained at a temperature higher than 70° F., 2½° must be subtracted from the readings of the supply water temperature for every degree the enclosure was kept above 70° before consulting the chart. If the enclosure was maintained at a temperature below 70° F., 2½° must be added to the readings of the water supply temperature for every degree below 70° before the chart is consulted. Having determined what the new setting shall be, the screws 74 and 75 should be loosened and the entire switch and lever support 60 slid to either the right or the left until the pointer 80 points to the correct scale setting on the scale 90. After this adjustment has been made the screws 74 and 75 are again tightened. It is then advisable to make another check reading of the outside temperature and the supply water temperature. In order to make certain that the vertical adjustment of the switch 30 and button 31 relative to the bottom surface 14 of the lever arm 10 is still correct after the lateral adjustment of the switch 30 has been made and to readjust the same if it has been rendered incorrect, additional readings of the outside temperature and of the supply water temperature are made to determine if such readings when applied to the chart intersect and fall on the predetermined oblique line, and, if they do not, then the switch 30 and button 31 should be raised or lowered by adjusting the knob 34 such that the supply water temperature will change and readings of the same and the outside temperature when applied to the chart will intersect and fall on the said line rather than on some line parallel thereto and such that the house temperature will be maintained continuously at 70° F. rather than at some higher or lower level.

For example, if the owner desires the house temperature to be below 70°, for instance, 68° F., the first step in resetting the controller is to bring the house to a temperature of 68° F. and keep it there for at least one-half hour. The next step is to note the outside and water temperatures while continuing to keep the house at this temperature. Assuming that the thermometer measuring the temperature of the water in the supply main shows it to be 180° F. when the switch 30 closes and that the outdoor temperature at the time is +10° F. Since the room temperature is at 68° F., 5 degrees (2½×2) must be added to the water temperature, making it 185° F. Having found the necessary data, the next step is to consult the chart, Figure 2. From this it can be seen that a vertical line through +10 and a horizontal line through 185 intersects halfway between the lines numbered 8 and 9. This indicates that the proper controller setting is 8.5 on scale 90 and that the switch and arm support 60 should be moved so that pointer 80 will point to the setting 8.5 on the scale 90. After the switch and arm support have been moved over to the new setting of 8.5, the system should be checked at another outside temperature. Let us assume that this time the temperature of the water in the supply main is found to be 172° F. and the outside temperature is +15° F. Before consulting the chart 5 degrees must again be added to the water temperature (2½×2) bringing it up to 177° F. Applying these values to the chart and taking a vertical line through +15 and a horizontal line through 177, it is found that they intersect halfway between lines 8 and 9. This indicates that the ratio setting is proper and that no further adjustment is necessary.

Although the combination of the temperature controller and the adjustment chart are particularly suitable for controlling a hot water heating system, this method of controlling is not limited to such systems but is adaptable for controlling the setting of any control unit which operates a switch actuated by variations of a plurality of temperatures in accordance with a predetermined ratio setting. The method may also be used for the setting of controllers used to control the discharge temperature of hot air furnaces wherein the outside temperature is used as the basic temperature, or where the controller is used in a similar manner in cooling systems of all kinds. Furthermore, the method is not limited to heating and cooling systems. With a proper chart, which can be readily constructed in accordance with the information given above, it may be used where the controller is used in manufacturing processes to vary the temperature of a material such as, for example, when a bath of liquid is changed or varied in accordance with the temperature of some other medium. Furthermore, it may also find use in setting and resetting controllers used to vary the temperature of an object not according to the temperature change of some other source but according to the percentage to which some other object is heated to a certain temperature, for example, when the controller is used to maintain a bath of liquid at a specific temperature, for example, 100°, when a certain rod of metal at some other location is heated to a temperature of, for example, 500° for a certain distance of its length. Many other applications of this method of setting temperature controllers will become apparent to those skilled in the art.

While this method of controlling the setting of temperature controllers has been applied in the above specification to controllers operating on a lever principle, it will be readily understood that the principles herein described will permit the application of this method to any control unit whose setting varies in accordance with some ratio setting of the outside temperature responsive element to that of the other temperature responsive element, and that therefore variations of the specific method herein illustrated can be made without departing from the spirit of my invention, or the scope of the claims appended hereto.

I claim:

1. A method for regulating a heating system for an enclosure subject to varying outside temperatures composed of a thermal control element in said system having an adjustment means including a pointer means and cooperating scale, for varying the heat supply to the said system upon changes in the outside temperature and changes in the temperature of said heat supply to maintain said enclosure at a substantially constant temperature which comprises, providing a graph chart applicable to said enclosure and similar enclosures of diverse radiation characteristics having lines along one axis setting out exterior temperatures and lines along another axis setting out heat supply temperatures and intersecting the first mentioned lines, said chart also having a plurality of superimposed oblique lines, the directions of which are determined by the ratio of the variation of outside temperatures with the variations of the heat supply temperatures at a specific constant enclosure temperature, said oblique lines indicating positions of the said adjustment means adapted to maintain the constant temperature within such enclosures at varying outside temperatures and varying heat supply temperatures, observing by means of a thermometer, at any specific outside temperature, the heat supply temperature necessary to maintain said enclosure at the substantially constant inside temperature, and determining from said chart the oblique line indicating the proper position of said adjustment means by ascertaining the intersection point of the line showing the observed heat supply temperature and the line showing the specific outside temperature and then ascertaining which oblique line passes through or nearest to said intersection point, and then moving said element along said scale such that the pointer means is set upon the scale at the point thereon corresponding to the setting predetermined by the oblique line on the chart.

2. A method for regulating a heating system for an enclosure subject to varying outside temperatures composed of a thermal control element in said system having an adjustment means including a pointer means and cooperating scale, for varying the heat supply to the said system upon changes in the outside temperature and changes in the temperature of said heat supply to maintain said enclosure at a substantially constant temperature which comprises, providing a graph chart applicable to said enclosure and similar enclosures of diverse radiation characteristics having lines along one axis setting out exterior temperatures and lines along another axis setting out heat supply temperatures and intersecting the first mentioned lines, said chart also having a plurality of superimposed oblique lines, the directions of which are determined by the ratio of the variation of outside temperatures with the variations of the heat supply temperatures, when the temperature of the enclosure is maintained at 70° F., said oblique lines indicating positions of the said adjustment means adapted to maintain the constant temperature within such enclosures at varying outside temperatures and varying heat supply temperatures, observing by means of a thermometer, at any specific outside temperature, the heat supply temperature necessary to maintain said enclosure substantially at 70° F., and determining from said chart the oblique line indicating the proper position of said adjustment means by ascertaining the intersection point of the line showing the observed heat supply temperature and the line showing the specific outside temperature and then ascertaining which oblique line passes through or nearest to said intersection point, and then moving said element along said scale such that the pointer means is set upon the scale at the point thereon corresponding to the setting predetermined by the oblique line on the chart.

3. A method for regulating a heating system for an enclosure subject to varying outside temperatures composed of a thermal control element in said system having an adjustment means including a pointer means and cooperating scale, for varying the heat supply to the said system upon changes in the outside temperature and changes in the temperature of said heat supply to maintain said enclosure at a substantially constant temperature which comprises, providing a graph chart applicable to said enclosure and similar enclosures of diverse radiation characteristics having lines along one axis setting out exterior temperatures and lines along another axis setting out heat supply temperatures and intersecting the first mentioned lines, said chart also having a plurality of superimposed oblique lines, the directions of which are determined by the ratio of the variation of outside temperatures with the variations of the heat supply temperatures when the temperature of the enclosure is maintained at 70° F., said oblique lines indicating positions of the said adjustment means adapted to maintain the constant temperature within such enclosures at varying outside temperatures and varying heat supply temperatures, observing by means of a thermometer, at any specific outside temperature, the heat supply temperature necessary to maintain said enclosure at any desired temperature and determining from said chart the oblique line indicating the proper position of said adjustment means by ascertaining the intersection point of (1) the line representing the observed temperature of the heat supply plus a predetermined number for each degree difference, if any, between the said desired enclosure temperature and 70° F., and (2) the line showing the specific outside temperature and then ascertaining which oblique line passes through or nearest to said intersection point, and then moving said element along said scale such that the pointer means is set upon the scale at the point thereon corresponding to the setting predetermined by the oblique line on the chart.

FERDINAND JEHLE.